United States Patent
Appelt et al.

[11] Patent Number: 6,042,918
[45] Date of Patent: *Mar. 28, 2000

[54] SURFACE CONDITIONING ARTICLES AND PROCESS FOR MAKING SAME

[75] Inventors: Marian R. Appelt, Stillwater; Loren L. Barber, Jr., Lake Elmo; Lacy Max Hurlocker; Ronald E. Lux, both of White Bear Lake; John B. Young, Woodbury, all of Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/650,391

[22] Filed: May 20, 1996

[51] Int. Cl.$^7$ .................................. B32B 5/26; B32B 5/28
[52] U.S. Cl. ........................... 428/64; 428/219; 428/906; 428/908.8; 442/104; 442/148; 442/170; 442/171; 442/364; 442/392; 442/401; 442/402; 442/414
[58] Field of Search ........................... 442/364, 392, 442/401, 402, 414, 104, 148, 170, 171; 428/906, 908.8, 909, 64, 219; 492/41

[56] References Cited

U.S. PATENT DOCUMENTS

| | | |
|---|---|---|
| 1,854,509 | 4/1932 | Fish . |
| 2,801,461 | 8/1957 | Kusters ........................... 29/120 |
| 3,490,119 | 1/1970 | Fukuyama et al. ............... 29/132 |
| 3,646,651 | 3/1972 | McGaughey et al. ............. 29/130 |
| 3,800,381 | 4/1974 | Brafford ........................... 29/132 |
| 3,853,677 | 12/1974 | Kai .................................. 161/36 |
| 4,368,568 | 1/1983 | Watanabe ........................ 29/130 |
| 4,400,418 | 8/1983 | Takeda et al. ................... 428/36 |
| 4,475,275 | 10/1984 | Edwards .......................... 29/110 |
| 4,583,966 | 4/1986 | Ocker et al. .................... 493/374 |
| 4,603,075 | 7/1986 | Dergarabedian et al. ....... 428/235 |
| 4,669,163 | 6/1987 | Lux et al. ........................ 29/125 |
| 4,673,616 | 6/1987 | Goodwin . |
| 5,247,740 | 9/1993 | Curtis et al. ................. 29/895.213 |
| 5,525,387 | 6/1996 | Rossi ............................... 442/392 |
| 5,549,967 | 8/1996 | Gstrein .............................. 428/909 |

FOREIGN PATENT DOCUMENTS

| | | | |
|---|---|---|---|
| 0 227 375 | 7/1987 | European Pat. Off. . | |
| 78 22829 | 3/1979 | France ...................... | B65G 39/00 |
| 2632848 | 2/1977 | Germany ................... | D06B 15/02 |
| 2046310 | 2/1990 | Japan ........................ | F16C 13/00 |

OTHER PUBLICATIONS

Database WPI, Section Ch, Week 8540, Derwent Publications Ltd., London, GB; Class A32, AN 85–246459, XP002027385, & JP 60 162 628 A (Chiryu Tkalon KK), Aug. 24, 1985.

Article by L.W. Legacy entitled "Recent Advances in Wringer Roll Technology" *Iron and Steel Engineer*, vol. 60, No. 4, Apr. 1983, pp. 42–44.

3M brochure 61–5000–5419–4(492) JR entitled "3M Wiper Bars" Scotch–Brite™ Surface Conditioning Products, St. Paul MN, undated.

3M brochure 61–5000–6804–6 (992)ii entitled "3M Mill Rolls" Industrial Trades, St. Paul MN, Aug. 1989.

(List continued on next page.)

*Primary Examiner*—Elizabeth M. Cole
*Attorney, Agent, or Firm*—Scott R. Pribnow

[57] ABSTRACT

Caustic- and acid-resistant nonwoven articles useful for surface conditioning of sheeting, especially metal sheeting, and a method for the manufacture of such articles are described. The articles comprise a plurality of compacted, stacked nonwoven web elements, the web elements each comprising entangled fibers bonded together at points of mutual contact by an adhesive binder, the binder comprising a terpolymer of acrylonitrile butadiene styrene. The nonwoven articles can be configured into any of a variety of convenient and useful shapes, such as roll shapes and slab or bar shapes.

33 Claims, 1 Drawing Sheet

OTHER PUBLICATIONS 3M brochure 61–5001–1680–3 (241.5)ii entitled "3M Mill Rolls" Abrasive Systems Division, St. Paul MN, 1994.

3M brochure 61–5000–9155–0 entitled "Which wringer roll has been in use 30 months and saved over $60,000?" Abrasive Systems Division, St. Paul MN, 1991.

3M brochure 61–5000–9828–2 entitled "If your rubber rolls aren't wringing this well after six months, give us a ring." Abrasive Systems Division, St. Paul MN, 1991.

Supplement entitled "Coil Coating: Its time is here?" *Automotive Engineering*, May 1988.

3M brochure 61–5001–1624–1 entitled "Keep your coil and sheet quality from slipping out of control." Abrasive Systems Division, St. Paul MN, 1993.

3M brochure 61–5000–2983–2(35.3)R1 entitled "New Type Mill Roll Reduces Downtime At Aluminum Plant" Industrial Trades, St. Paul MN, 1985.

3M brochure 61–5000–3224–0(81.05)R2 entitled "3M Wringer Rolls Reduce Costs At Armco Steel Works" Scotch–Brite™ Surface Conditioning Products, St. Paul MN, 1985.

Article entitled "Roll Switching Boosts Production" *33 Metal Producing*, Apr. 1993.

3M brochure 61–5000–6401–1(49.3)R1 entitled "3M brand Acid Mill Rolls" Scotch–Brite® Surface Conditioning Products, St. Paul MN, 1989.

3M brochure 61–5000–6892–1(991)R1 XY entitled "3M brand Mill Rolls Wringer Applications" Scotch–Brite® Surface Conditioning Products, St. Paul MN, 1989.

3M brochure 61–5001–1067–3 entitled "Surface Conditioning Products" 3M Abrasive Systems Division, St. Paul MN, 1994.

SURFACE CONDITIONING ARTICLES AND PROCESS FOR MAKING SAME

The present invention relates to nonwoven articles useful in the surface conditioning of sheeting (e.g., metal sheeting), and to a process for making such articles.

BACKGROUND OF THE INVENTION

Rotatable surface conditioning rolls ("mill rolls") are commonly used in the manufacture and processing of metal sheets or metal coils in continuous production lines. Such surface conditioning rolls are generally utilized in so-called "wringer applications" as well as "oiler applications".

In wringer applications, mill rolls and like articles are used to prevent the cross contamination of treating solutions. For example, the manufacture of metal coil or strip typically involves many process operations using a variety of treating solutions designed to variously clean, degrease, remove scale, pickle, rinse, surface etch, lubricate, and/or protect the metal surface. During these operations, it is important to prevent the contamination of these often incompatible treating solutions. Thus, a squeegeeing ("damming") operation is performed at the surface of the metal sheet to remove excess treating solution from the metal surface as the metal strip exits each of the treatment tanks to thereby prevent the inadvertent mixing of treating solutions. Squeegee arrangements have included the use of conventional rotatable rubber rolls as well as wiper bars made of felt or cork. These prior rolls or wiper bars, however, have generally suffered relatively short useful lives in the aforementioned wringing applications.

In oiler applications, materials ("oils") are applied to the surface of metal sheets or foils as protection against corrosion, to prevent handling marks or to provide lubrication for subsequent processing steps. Control of coating thickness is desired in such oiler applications in order to optimize the procedure by using the minimum amount of material needed in the application. The use of rubber rolls in these applications has been unsatisfactory because of their relatively short useful lives.

The short lives of the rubber rolls in the foregoing applications is attributable to the structural properties of the rubber surfaces including, for instance, their non-compressibility. The relatively non-compressible nature of rubber rolls, for example, makes them susceptible to cut propagation and other structural damage at the nip of the roll. Additionally, the surfaces of rubber rolls are easily torn, gouged or cut by the edges of the splices in the metal sheet. Once a rubber roll has been damaged, the initial cut, tear, or gouge will usually enlarge due to compressive forces at the nip and tension forces on either side of the nip. Consequently, frequent repair (e.g., surface dressing) or replacement of these articles has been required, thereby creating unscheduled production line downtimes with associated losses and costs.

Moreover, the closed, non-porous nature of the rubber surfaces of the foregoing rolls, renders repair quite onerous, if possible at all. For example, repair splices and patches applied to a damaged rubber roll can present a surface incongruity that may damage the metal sheets being manufactured or otherwise treated. Finally, the aforementioned rubber are known to hydroplane when wet, thereby undesirably disrupting the contact between the roll and the metal sheet.

To address the above mentioned drawbacks associated with the use of rubber surface conditioning products, rolls and bars made of compacted, unified, discrete sheets of nonwoven fabric have been used in the foregoing applications. In general, nonwoven fabric articles have been stronger and more resistant to tears and cuts than rubber rolls, for example. Moreover, nonwoven fabric articles possess the ability to self heal, thereby helping to minimize the risk of production line shutdown due to roll (or bar) failure. The porous nature and high void volume inherent in these nonwoven fabric articles provide a high degree of absorbency to aid in squeegee and tension applications. In addition, the absorbency of the fabric articles is useful in applying thin uniform film thicknesses of lubricants or other solutions onto metal sheet surfaces in oiling applications.

The porous surfaces of nonwoven fabric articles permit loose debris (e.g., fine metal particles or dirt) to be picked-up from the surface of metal sheet, or the like. The debris penetrates into and is retained within the body of the article, thus preventing the debris from scratching or causing coil marks on the metal sheet material. Nonwoven fabric articles also provide a high coefficient of friction on many metal surfaces and they stay in contact with metal when wet to maintain the uniform high tension needed to prevent significant slippage.

Although fabric articles generally have enjoyed longer useful lives than their rubber counterparts, fabric articles are known to be susceptible to damage when exposed to very harsh chemicals such as strong acids, caustic liquids, electro-plating solutions and the like. In the manufacture of metal sheeting, for example, a variety of harsh chemical agents are typically used. Treating agents containing relatively high concentrations of hydrochloric acid, sulfuric acid, chromic acid, salts of the foregoing acids or basic agents such as sodium or potassium hydroxide are commonly used. Solutions of these treating agents can have a pH less than one or as high as 14. After a treating agent has interacted with the surface of the metal sheet, two squeegeeing operations coupled with water rinsing are generally required to effectively remove the agent from the metal surface. Many of the organic polymeric materials used in the manufacture of the foregoing nonwoven fabric articles will degrade or disintegrate after repeated squeegee operations which expose the article to treating solutions at the extreme pH values mentioned above. In particular, the exposure of such articles to extreme caustic conditions (e.g., pH of about 14) in the presence of oils is known to readily degrade nonwoven fabric articles.

Fabric articles are described in the technical and patent literature, as discussed below. Other than the surface treating article described by Lux et al. (U.S. Pat. No. 4,669,163), none of the cited references discloses a surface conditioning article having a desired resistance to harsh chemical environments.

Kusters (U.S. Pat. No. 2,801,461) discloses a roll for use in squeezing liquids from textiles made of a plurality of flat, angular, axially compressed discs composed of nonwoven fibers bonded with vulcanized latex. The discs are mounted and retained under compression on a support shaft. The fibers uses in the described article include tensilized nylon and natural fibers such as ramie, cotton, or sisal-hemp.

Kai (U.S. Pat. No. 3,853,677) discloses a roll made from axially compressed discs of a nonwoven fabric formed from a mixture of natural fibers and fibers made from a high molecular weight synthetic polymer wherein the fibers are bonded with a resinous material. The discs are heated and compressed at $78 \times 10^6$ Pa to form a finished roll having a Poisson's ratio of about 0.5 and shearing stress of about 1200 $kg/m^2$.

L. W. Legacy, in "Recent Advances in Wringer Roll Technology", Iron and Steel Engineer, Vol. 60, No. 4, April, 1983, pp. 42–44, discloses the preparation of rolls made of compacted discs of nylon staple fibers bonded with a strong flexible binder resin. Legacy describes these rolls as more tear and cut resistant than conventional rubber covered rolls and capable of self-healing after exposure to large local stresses. The described rolls, however rolls may not be used in applications exposing them to a pH outside the range of 2 to 10. Below a pH of 2, the fibers in the articles dissolve, and above a pH of 10, the resin that binds the fibers together dissolves.

Lux et al. (U.S. Pat. No. 4,669,163) disclose a polyolefin fiber wringer roll compressed and bonded in a specified manner and made with heat-activated binder fibers to provide an article resistant to acidic and alkaline environments. The use of an organic solvent-borne acrylonitrile-butadiene copolymer as an optional fiber binder is disclosed. Although the article described by Lux et al. represents an advance in the art, there continues to be a need for better-performing, longer lived squeegee articles, especially for use in highly-alkaline environments and in the presence of oils.

Watanabe (U.S. Pat. No. 4,368,568) discloses a rubber covered roll comprising roughened metal core and a polyurethane covering with an intermediate layer consisting of a spirally-wrapped inorganic fiber layer (adjacent the metal core) and an organic fiber layer, both layers containing inorganic powder and a thermosetting resin.

Edwards (U.S. Pat. No. 4,475,275) disclose a method for producing a filled calendar roll by a stacked-disc manufacturing method employing vacuum compression.

Ocker et al. (U.S. Pat. No. 4,583,966) disclose a stacked-disc manufacturing method employing vibratory compression.

Takeda et al. (U.S. Pat. No. 4,400,418) disclose a dampener roll with a woven fabric covering comprising, in part, polyurethane fibers or yarns.

German patent reference 2,632,848 (MSKD) discloses stacked rubber discs bonded by harder rubber and the product is useful for squeegee applications.

Japanese patent reference 2-046310 (Hisayuki) discloses a hollow-fiber roll.

Fish (U.S. Pat. No. 1,854,509) discloses a filling for a calendar roll having heat resistant sections which can be formed of laminated discs made of heat resistant material.

French Patent Application No. 78 22829 discloses a hard felt roll formed by the compression of numerous hard felt, resin-impregnated disks on a steel mandrel to form a roll. The resin can be a butadiene resin, such as a butadiene-acrylonitrile rubber and a butadiene-styrene rubber, among others disclosed.

Degarabedian et al. (U.S. Pat. No. 4,603,075) disclose a composite shoe component comprising a polyester nonwoven fabric layer needle-punched to a woven polypropylene scrim, with the resulting combination being saturated with acrylonitrile butadiene styrene resin having a Tg of $-10$ to $-40°$ C. with specified tear strength and permeability.

Brafford (U.S. Pat. No. 3,800,381) discloses a covered roll for paper making having an outer cover formed of a wet lay process with a reinforcing mat of nonwoven needled polyester fibers which are wetted and impregnated with a binder material at room temperature and placed on the outer surface of the roll.

Fukuyama et al. (U.S. Pat. No. 3,490,119) disclose a polyurethane rubber covered roll for textile, paper and metal industry usage where the rubber is coated over a metal core reinforced by resin-impregnated fiber.

McGaughey et al. (U.S. Pat. No. 3,646,651) disclose an abrasion and corrosion resistant composite structural material, specifically rolls for use in steel-fabricating processes, where the roll is formed with variegated layers including fibrous reinforcing materials and an outermost resilient covering described as rubber material.

Curtis et al. (U.S. Pat. No. 5,247,740) disclose a method for forming a longitudinally extending keyway portion in a mill roll having a central bore.

It can be appreciated that further refinements and advances in the important technology embodied by nonwoven fabric articles should be of interest and value to the milling industry. It is desirable to fulfill a long felt and unsolved need by providing nonwoven fabric articles such as mill rolls or the like useful in surface treating applications which provide the aforementioned advantages of prior nonwoven fabric articles while also being chemically resistant. It is especially desirable to provide such articles having a construction suited for use in harsh chemical environments wherein the articles are exposed to extremely acidic or extremely caustic solutions, and especially caustic solutions in the presence of oils. It is also desirable to provide a method for the manufacture of the foregoing articles.

SUMMARY OF THE INVENTION

The present invention provides nonwoven articles suited for the surface conditioning of sheeting. The articles are highly resistant to physical and chemical damage when subjected to harsh caustic or acidic chemical environments and are especially resistant to damage in caustic environments in the presence of oils.

The term "surface conditioning", as used herein, encompasses solution stripping (e.g., wringing applications) thin film coating (e.g., oiling applications), and like operations, as performed on surfaces of sheeting, especially metal sheeting (e.g., aluminum sheeting). "Chemically resistant", in referring to the fibers used in the articles of the invention, refers to the ability to tolerate exposure to the conditions experienced by the fiber in use without significant degradation.

In one aspect, the invention provides an article suited for use in the surface conditioning of sheeting, the article comprising a plurality of compacted, stacked nonwoven web elements, the web elements each comprising entangled fibers bonded together at points of mutual contact by an adhesive binder, the binder comprising a terpolymer of acrylonitrile butadiene styrene(e.g., "ABS terpolymer").

The ABS terpolymer preferably has a relatively high glass transition temperature, typically between $-10°$ C. and $+40°$ C., and preferably between $+0°$ C. and $+25°$ C. The ABS terpolymer has been found to endow the finished article (e.g., a mill roll) with enhanced surface conditioning performance capabilities with excellent resistance to damage when exposed to harsh chemicals. The fibers of the nonwoven web elements preferably are chemically resistant and can comprise any of a variety of natural, organic, or inorganic fiber materials, depending on the expected harshness of the chemical environment to be encountered by the finished article, for example. Polyolefin fibers, and especially isotactic polypropylene fibers, are most preferred in the practice of the invention because of their resistance to harsh chemicals and their desirable physical properties in surface conditioning environments (e.g., flexibility and low brittleness).

The articles of the invention, made with nonwoven web elements of polyolefin fiber, are especially useful in squeegee applications in strongly alkaline environments and in the presence of oils. The nonwoven articles of this invention can be configured into many convenient shapes useful for the surface conditioning of metal sheeting. Exemplary of such useful shapes include roll shapes useful as rotatable mill rolls and slab or bar shapes useful as static or moveable wiper bars in metal sheeting fabrication and processing operations.

In another aspect, the invention provides a roll suited for the surface conditioning of sheeting, the roll comprising a cylindrical body supported on its cylindrical axis for rotation, the cylindrical body comprising a plurality of compacted, stacked, disc shaped nonwoven web elements, the web elements each comprising entangled fibers, wherein adjacent fibers in each web element are bonded together at points of mutual contact by an adhesive binder, the binder comprising a terpolymer of acrylonitrile butadiene styrene.

In another aspect, the invention provides a process for making a nonwoven article suited for the surface conditioning of sheeting, the process comprising:

(a) providing a plurality of nonwoven web elements, the web elements comprising entangled fibers bonded at their points of mutual contact by a dried terpolymer of acrylonitrile butadiene styrene;

(b) stacking the plurality of nonwoven web elements into a pile;

(c) compacting the pile under a compaction force;

(d) restraining the pile in its compacted configuration;

(e) heating the pile in its compacted configuration to an elevated temperature to crosslink the terpolymer;

(f) cooling the heated pile to provide an article having a density of at least about 244 kg/m³.

The step (a) of providing of a plurality of integrated nonwoven web elements may comprise first forming a web, coating the web with an aqueous dispersion of the terpolymer, heating to at least dry the terpolymer, and cutting the web elements from the web. The nonwoven web elements can be consolidated by needle tacking prior to stacking, and preferably, the web elements are die cut from a single nonwoven source web.

In still another aspect, the invention provides a process for making a nonwoven article suited for the surface conditioning of sheeting, the process comprising:

(a) providing a plurality of nonwoven web elements, the web elements comprising entangled fibers bonded at their points of mutual contact by a dried terpolymer of acrylonitrile butadiene styrene;

(b) stacking the plurality of nonwoven web elements into a pile;

(c) compacting the pile under a first compaction force;

(d) applying binder composition to the pile;

(e) further compacting the pile under a second compaction force;

(f) heating the pile in its compacted configuration to an elevated temperature to crosslink the terpolymer; and (g) cooling the heated pile to provide an article having a density of at least about 244 kg/m³.

In this method, the binder composition of step (d) may be the same as or different than the ABS terpolymer. The first compaction force is less than the second compaction force and the binder composition is applied to the compacted pile to saturate the pile prior to compacting to a second compaction force.

In still another aspect, the invention provides a process for making a nonwoven article suited for the surface conditioning of sheeting, the process comprising:

(a) providing a plurality of nonwoven web elements, the web elements comprising entangled fibers;

(b) stacking the plurality of nonwoven web elements into a pile;

(c) compacting the pile under a first compaction force;

(d) applying an aqueous dispersion of acrylonitrile butadiene styrene terpolymer to the pile;

(e) further compacting the pile under a second compaction force;

(f) heating the pile in its compacted configuration to an elevated temperature to crosslink the terpolymer; and (g) cooling the heated pile to provide an article having a density of at least about 244 kg/m³.

In this embodiment, the web elements are stacked into a pile, preferably prior to the application of any terpolymer. The providing step may comprise first forming a web, cutting the web elements from the web, and consolidating the web elements by needle tacking prior to stacking.

Other features and advantages of the invention will be better understood from the following description of the drawings and preferred embodiments of the present invention.

DETAILED DESCRIPTION OF THE PREFERRED EMBODIMENTS OF THE INVENTION

Figure 1:
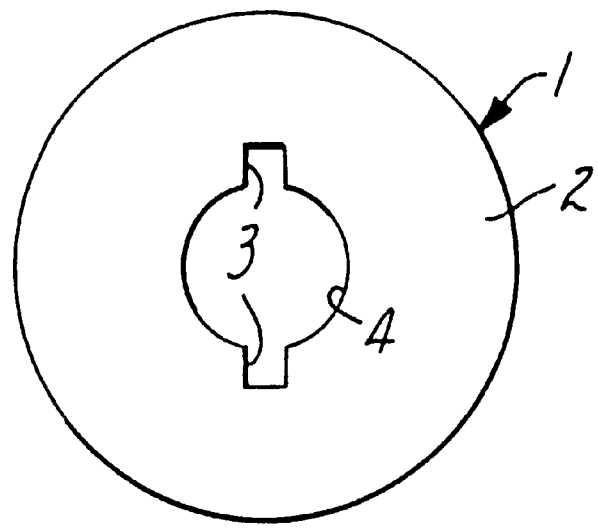
FIG. 1 shows a top plan view of a disc-shaped web element segment used to make the roll of the invention.

The invention provides any of a variety of surface conditioning articles suitable for use in the above discussed surface conditioning operations for the processing of metal sheeting, for example. Although the structural details of the preferred embodiment are described in the context of mill rolls, the articles of the invention may be provided in a variety of configurations such as mill rolls, wiper bars and the like. In describing the preferred embodiment, reference is made to the drawings wherein structural features are identified with reference numerals and wherein like numerals indicate like structures.

Referring to the drawings, a disc 1 comprising a die cut nonwoven web element 2 is shown. Disc 1 is an annulus having a centered opening 4 with opposed slots 3 to fit over a key element on a support shaft. As is discussed below, a plurality of the discs 1 are assembled into a compacted pile which is restrained in its compacted configuration by appropriate means to provide a roll suitable for the surface conditioning operations described herein. Disc 1 is a portion of a nonwoven web comprising fibers bonded to one another at their points of mutual contact with a suitable adhesive binder. The fibers of the nonwoven web element 2 preferably are chemically resistant and the preferred binder is one which will enhance the chemical resistance of the fibers, especially in highly caustic environments where the web elements in the finished article may be exposed to combinations of caustic and oil materials.

Figure 2:
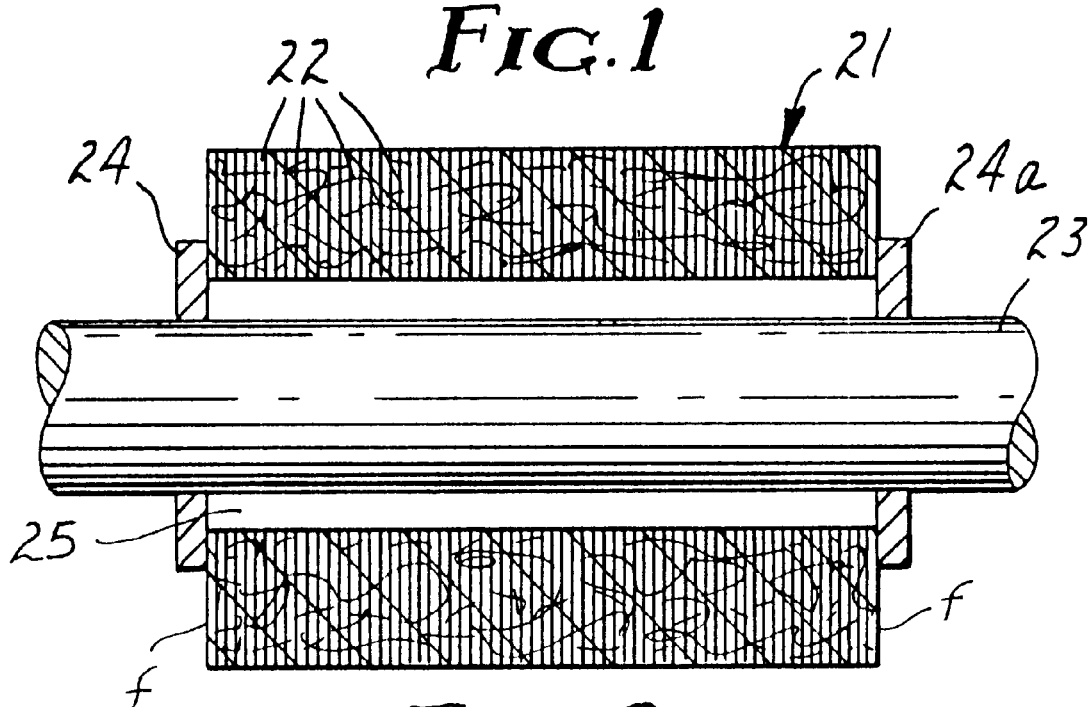
FIG. 2 is a view, partially in cross-section, of a roll made in accordance with the present invention and disposed on a keyed shaft.

As shown in FIG. 2, a roll 21 (e.g., a mill roll) according to the invention is provided as a compacted pile of nonwoven disc elements 22 disposed along support shaft 23. The shaft 23 may include one or more longitudinally extending drive keys 25, or other slots or appendages, to physically engage the opposed slots of the individual disc elements 22 (e.g., slots 3 of FIG. 1). This construction provides a rotatable support for the roll 21 while the keys 25 prevent significant rotational movement of the roll body 21 relative to the shaft 23. Although positive keys 25 are depicted on the shaft 23 of FIG. 2, it will be appreciated that a "reverse key" keyway configuration could also be provided wherein one or more projections in the periphery of the central opening (e.g., opening 4, FIG. 1) of the disc are constructed to project into a corresponding slot on the shaft.

As mentioned, a plurality of discs 22 are compacted and then restrained in their compacted configuration to form a roll 21. The compaction force applied to the discs 22 is sufficient to provide the roll 21 with a preferred density, typically at least about 244 kg/m$^3$ and generally less than about 960 kg/M$^3$. A suitable compaction force to obtain the foregoing densities is typically within the range from about $1 \times 10^6$ to $7 \times 10^6$ Pa. The compaction force is applied in an axial direction against the end faces "f" of the roll-shaped pile 21 by a suitable pressing device(not shown). The compacted pile of discs 22 may be restrained by any suitable means such as by adhesive bonding of the discs 22 within the pile 21 to one another, or by mechanical means such as by locking collars, depicted as flanges 24 and 24a, adapted to be slidable on and mechanically engagable with shaft 23. The locking collars 24, 24a provide positive pressure against the disc faces "f" and serve to position the roll 21 at a desired position along the shaft 23 while preventing slippage therealong, all in a known manner.

As an alternative to mounting the discs directly on a support shaft, such as shaft 23, those skilled in the art will appreciate that a plurality of discs 22 may be mounted, compacted and then restrained on a hollow open-ended tube (not shown) of adequate strength to withstand compacting. The cross sectioned configuration of the tube may be circular, square or otherwise shaped and may include appendages to accommodate key slots in the central openings of the discs. The tube will have an opening therethrough coextensive with its longitudinal axis to then permit mounting of the tube onto an appropriate support shaft having a cross sectional configuration substantially identical to the that of the foregoing tube.

Additionally, a roll can be formed along a mandrel which is removed after the roll body has been formed. Upon removal of the mandrel, the roll comprises the compacted pile of nonwoven web elements or discs adhesively secured to one another in their compacted state. The central opening through the pile may be further cut or profiled along the cylindrical axis of the pile to permit positioning of the roll along a preexisting shaft and to accomodate the aforementioned drive keys. Details of the manufacture of the foregoing articles are further discussed below.

Rolls made in accordance with the invention, such as roll 21, can be used alone or in combination with one or more rolls of similar or different constructions to provide a multiple roll set in any conventional configuration as may be used to treat a strip of material such as metal sheet, for example.

One configuration for rolls made according to the invention includes a cylindrical body comprised of a plurality of nonwoven web elements. The nonwoven web elements comprise fibers adhesively bonded to one another at their mutual contact points within each web element. Preferably, the plurality of web elements are also adhesively bonded to one another within the cylindrical body of the roll. The materials used to adhesively bond the fibers in the individual web elements and for bonding the elements to one another may be the same or different, and preferred materials are described below. The roll body may be dressed by grinding to provide an outer surface suitable for the intended use of the finished roll.

In the manufacture of the articles of the invention, a plurality of nonwoven web elements are used, as mentioned. The individual web elements are preferably cut (e.g., by die cutting) from a single nonwoven web. The web elements may be disc shaped, as discussed above, or they may be provided in another suitable configuration as may be determined by known criteria such as the contemplated end use of the finished article, for example.

The nonwoven webs from which the discs or other web elements are cut or stamped may comprise crimped staple fibers, continuous fibers or the like, and the webs may be formed by any of a variety of known methods such as by carding, air-lay methods or spunbond or melt blown techniques.

The fibers used to make the nonwoven fabric or web preferably comprise, at least in part, polyolefin polymers because of their resistance to acidic and basic aqueous liquids at moderately elevated temperatures. Preferably the polyolefin fibers will have a tenacity greater than about 1 gram per denier to ensure adequate strength. It will be appreciated fiber compositions other than the foregoing polyolefin fibers may be used in the articles of the invention, especially if the finished article is to be used in an environment devoid of extremely acidic or alkaline conditions. Polyamide or polyester fibers may be successfully used where a resultant surface conditioning roll of this invention is to be operated so as to encounter only mildly acidic, mildly basic, or neutral treating solutions. Also, carbon fibers, and natural fiber materials such as cotton, wool, and the like, and inorganic fiber materials such as glass and alumina based-fibers, are all contemplated as useful in the aforementioned discrete nonwoven elements used in the formation of the articles of the present invention.

As used herein, the term "polyolefin fiber" means a fiber that consists of at least 10 percent by weight of a polyolefin polymer-based composition. Moreover, the polyolefin material is present in the major outer surface regions of the fiber so that where the fiber comprises less than 100% of a polyolefin polymer-based composition, the polyolefin polymer-based composition will be disposed at least along the major surface of the fiber to cover the fiber along its length and to surround its perimeter.

Suitable polyolefin fibers include sheath-and-core fibers comprising a sheath of polyolefin polymer-based composition and a core comprising another material. In such bicomponent fibers, preferably only the ends of the core component are exposed. The term "polyolefin polymer-based composition" refers to a material wherein the major organic polymeric component is polyolefin polymer. The fiber composition may also include known additives, fillers and the like. Polyolefin fibers used herein preferably can withstand solutions that have a pH of less than one and as high as 14.

Polyolefin fibers having linear densities from about 1 to about 50 denier are suitable for use in the articles of the invention and a range from about 1 to about 30 denier is preferred. Rolls made with excessively fine fibers will not provide adequate resistance to physical damage and excessively coarse fibers will provide articles unable to provide an adequate squeegee action in surface treating applications. Fiber lengths can be virtually continuous, as in the case of spunbonded webs, or the fibers can be of finite length (e.g., crimped staple fiber). For air laid or carded webs, for example, crimped staple fibers having a length ranging from about 25 to 100 mm are preferred. The crimped staple fibers need be only slightly crimped to obtain webs with suitable strength to withstand processing of the unbonded web.

Polyethylene, polypropylene and polybutylene are examples of preferred polyolefins for use as fibers in the invention. Among these, isotactic polypropylene is most preferred. As mentioned, sheath:core bicomponent fibers may be used. Preferred bicomponent fibers are those having a sheath component comprising polyolefin polymer with a core component comprising another polyolefin composition or a polymeric composition other than a polyolefin. One preferred sheath:core bicomponent fiber is one which comprises an isotactic polypropylene sheath and a nylon core (50% sheath; 50% core by volume), the fiber having a draw ratio from about 2.5:1 to 3.5:1, and preferably about 3:1. Preferred materials for use in the aforementioned bicomponent fiber include polypropylene commercially available under the trade designation "Exxon 3445" from Exxon Corporation of Houston, Texas; nylon 6 commercially available under the trade designation "BASF Ultramid B3 Natural" available from BASF of Parsippany, N.J. In the manufacture of these bicomponent fibers, a 10% aqueous solution of a fiber finish material (available under the trade designation "Dacospin FT504", from Henkel Chemical Corp. of LaGrange, Illinois) is used as a fiber processing lubricant. The film finish solution is used in a known manner to provide an increase in the fiber wet add-on weight of about 1%. Such bicomponent fibers may be made by conventional coextrusion techniques.

Spunbonded nonwoven webs comprising the aforementioned polyolefin fibers are preferably strengthened by consolidation in a needle tacking operation after web formation and prior to the application of adhesive to the web. The needle tacking operation is performed in a known manner wherein barbed or felting needles are forced through the web to further entangle the fibers and thereby consolidate the web. Spunbonded polypropylene, when compacted (e.g., by needle tacking) and bonded with a suitable adhesive, provides useful web element elements for the formation of rolls and the like.

One preferred nonwoven web suitable for use in preparing the web elements to be used in the articles of the invention is a carded, needle-tacked, nonwoven web having a web weight of about 8 ounces/yd$^2$ (271 g/m$^2$) and comprising a mixture of isotactic polypropylene staple fibers of different linear densities. Such a mixture of fibers includes (1) 50% by weight of 10 denier ×3.25 inch (11 dtex ×83 mm) fibers and (2) 50% by weight of 8 denier ×4 inch (102 mm) fibers. The foregoing web may be obtained commercially from Synthetic Industries, of Ringgold, Ga. under the trade designation "Synfab" style 50805.

The nonwoven web elements are treated with an adhesive bonding agent. The bonding agent used herein is preferably one which is chemically resistant even when exposed to acidic and basic chemical treating agents having a pH, at the low end, of less than one or as high as 14. Useful bonding agents having the aforementioned chemical resistance comprise ABS terpolymers. Preferred ABS terpolymers have a glass transition temperature ($T_g$) of between −10° C. and +40° C. and more preferably between +0° C. and +25° C. The ABS terpolymer is applied to the web element as a latex having a solids composition from about 15 to about 35 wt % acrylonitrile, from about 20 to about 40 wt % styrene, and from about 20 to about 65 wt % butadiene. More preferably the solids composition of the ABS terpolymer is about 33 wt % acrylonitrile, about 33 wt % styrene, and about 33 wt % butadiene. The ABS terpolymer preferably is carboxylated with a degree of carboxylation between about 0.5 to about 5.0 percent.

The aforementioned ABS terpolymers adhere well to polypropylene fiber webs and retain their resilience under dynamic conditions. Upon heating, the ABS terpolymers will readily crosslink, to provide a chemically resistant hardened binder. Suitable ABS terpolymers may be obtained commercially, such as that sold under the trade designation "Hycar 1578X1" available from B. F. Goodrich Specialty Chemicals of Cleveland, Ohio. The "Hycar" 1578X1 material is a heat reactive, carboxylated terpolymer that possesses a relatively high glass transition temperature ($T_g$) and exhibits high tensile and elongation properties. This material is obtained as a water-borne latex suitable for direct application to the nonwoven web. The material has a solids of 50% total solids, a pH of 8, glass transition temperature of 18° C., a Brookfield Viscosity (cps) of 80, a surface tension of 42 dynes/cm, a maximum residual acrylonitrile monomer content of 100 ppm, a specific gravity (latex) of 1.01 at 25° C., and a minimum film-forming temperature at room temperature.

The ABS terpolymer is applied in its liquid state (e.g., as a latex) to a nonwoven web in an amount sufficient to impregnate or saturate the web and permit bonding of adjacent fibers at least at their points of intersection and contact. The terpolymer may be applied to the web in any convenient manner, such as by dip coating, roll coating or spray coating. The solids content of the latex should typically be between about 25% and about 50%, and preferably is about 50%, by weight. Preferably, the terpolymer is applied to the nonwoven web by dip coating, and the saturated web element is then passed through a pair of nip rolls which are capable of providing sufficient pressure to the saturated web to adjust the binder add-on (on a dry basis) to between about 20 to 200%, preferably between about 70 to 90%.

The saturated web is heated in an oven to at least dry the binder. In a preferred embodiment, the saturated web is heated at about 120° C. for about 3 to 10 minutes to volatilize water from the terpolymer latex binder. The terpolymer can be fully hardened in a subsequent heating step.

The foregoing bonding procedure preferably bonds the fibers of the web to one another at their points of mutual contact, without undesired lowering of the porosity of the web. Once the nonwoven web is bonded in the foregoing manner, web elements (e.g., discs 1 of FIG. 1) of desired dimensions may be die cut or stamped from the web. A plurality of like web elements are then assembled into an ordered stack or pile of elements. The pile may be assembled along a support shaft, hollow tube, or along a mandrel, for example, so that the elements are all oriented in the pile in substantially the same manner, similar to the manner in which the discs 22 are oriented along shaft 23 in FIG. 2.

The pile is then compacted under a compaction force. In one aspect of the method for the manufacture of the inventive articles, the compaction pressure applied at this stage is sufficient to provide a desired density for the finished roll as may readily be determined by those practicing in the field. Preferably, the compaction force applied to the web elements is sufficient to provide a density of at least about 244 kg/m$^3$ and generally less than about 960 kg/m$^3$. A suitable compaction force to obtain the foregoing densities is typically within the range from about $1 \times 10^6$ to $7 \times 10^6$ Pa. The compaction force is applied in an axial direction against the end faces "f" (FIG. 2) of the roll-shaped pile 21 by a suitable pressing device.

The compacted pile is then restrained in its compacted configuration (e.g., within a suitable press), and heated to crosslink the terpolymer. Under the foregoing compaction pressures, the major surfaces of the individual web elements are pressed together and maintained in intimate contact with one another. When heated, the terpolymer on the web elements crosslinks to bond the fibers of the individual web elements at their mutual contact points and to bond adjacent web elements to one another to form a cohesive roll body. Curing of the ABS terpolymer is accomplished by heating the compacted pile at about 135° C. for a sufficient amount of time to achieve maximum crosslinking. The actual heating time will depend on the overall size of the article, and cure times can range from about 10 to 40 hours. The cured pile is allowed to cool to room temperature, and if needed, the surface of the pile may be machined to obtain a finished article suitable for surface conditioning operations.

If the article is formed on a mandrel, the mandrel may be removed from the pile to provide a roll in the form of a cylinder with a central opening extending therethrough. The central opening of the compacted pile may be modified to accommodate a keyed support shaft by use of the apparatus and method described in U.S. Pat. No. 5,247,740 (Curtis et al.), whereby a cutter is moved coaxially relative to the center opening in the compacted roll. The cylindrical roll body may be positioned along an appropriately shaped support shaft and held in place by suitable means such as by locking collars.

In a modification of the foregoing method of manufacture, additional bonding agent may also be added to facilitate bonding of the web elements. If desired, the compaction step is performed by applying a first compaction force to the stacked pile of web elements. The first compaction force is less than that required to provide a desired density for the finished article, as determined by the skilled artisan. Additional binder (either additional ABS terpolymer or another suitable adhesive material) may be added to the compacted pile in a known manner. The pile is then further compacted to achieve the desired density, and the binder and terpolymer are fully cured, as described above.

In another embodiment of the foregoing method, the pile layer may be formed using web elements which have not been treated with the terpolymer. The pile is compacted under a first compaction force, and the ABS terpolymer latex is applied to the compacted pile to thoroughly saturate the pile. The pile is then further compacted under a force sufficient to achieve the desired final density, and the terpolymer is cured, as described above.

In still another embodiment of the method, the terpolymer applied to the nonwoven web elements may be completely cured prior to the stacking step. A plurality of the cured web elements are then assembled directly on a support shaft or on a tube, compacted and mechanically restrained in a compacted configuration, as discussed herein. The thus assembled roll may then be used in a surface conditioning application. In this embodiment, the terpolymer is cured without first drying, and the further heating of the terpolymer after compacting is avoided. The web elements in the finished roll will not be adhesively bonded to one another, but are retained in a compacted configuration by a suitable mechanical restraint.

While the present invention has been described with reference to a cylindrical roll, those skilled in the art will appreciate that the invention also encompasses mill wipes or wiper bars or any other surface conditioning article formed by stacking and compressing web elements to form a compacted pile.

In addition to surface conditioning applications, the rotatable rolls of this invention also be used as drive, tension/bridle rolls and support rolls to advance metal sheets and strips during processing and finishing, for example. Wiper bars of this invention also can be used as guides on conveyors or in other material handling applications.

The features and advantages of the invention are further illustrated by the following non-limiting examples. All parts, percentages, ratios, and so forth, in the examples are by weight unless otherwise indicated.

EXAMPLES

Example 1 and Comparative Examples A and B

Example 1 and Comparative-Examples A and B demonstrate the improved resistance to harsh environments of the inventive nonwoven articles using the ABS terpolymer fiber adhesive composition. Degradation of the roll materials is evaluated by tensile strength measurements.

Example 1 was a 7 oz/yd$^2$ (238 g/m$^2$) carded and needletacked web element ("Nicolon type S 700", available from Nicolon Mirifi of Jefferson, Ga.) comprising 10 denier (11 dtex) polypropylene staple fibers (fiber length of about 38 mm) coated with a 48% solids acrylonitrile-butadiene-styrene terpolymer latex having a (cured) $T_g$ of 18° C. ("Hycar 1578X1" latex available from B.F. Goodrich Specialty Chemicals, Cleveland, Ohio) to a dry add-on of 80% by weight, and dried in an oven for 6 minutes at 110° C.

Comparative Example A is a composition that is commercially employed in mill roll applications and was made as in Example 1 with the exception that the nonwoven web element was a 7.3 oz/yd$^2$ (249 g/m$^2$) carded web of 6 denier (7 dtex) nylon 6,6 staple fibers and the coating was an acrylic latex ("Rhoplex TR653" available from Rohm & Haas Company, Philadelphia, Pa.).

Comparative Example B, also of a composition commercially available for mill roll applications, was made according to "Web Example 1" in U.S. Pat. No. 4,669,163, which description is incorporated herein by reference. As required in the '163 patent, the nonwoven fabric was not treated with a latex binder. The web comprised a needletacked polypropylene spunbonded web with a layer of side-by-side bicomponent melt bondable fibers of polypropylene and polyethylene incorporated in the web by further needletacking.

For testing purposes, the web elements of Example 1 and those of Comparative Examples A and B were each separately integrated into compacted articles of dimensions 8×10×1 inches (203×254×25.4 mm). In order to assure that the compacted articles were comparable, 8 inch by 10 inch (203×254 mm) sheets of the prepared fabrics were stacked to achieve a compacted article hardness of 90 Shore A, regardless of the number of sheets required. The sheets were then saturated with tap water and placed into a mechanical press. Each set of sheets were then compressed to a thickness of 1 inch (25.4 mm), forming a compressed article with a Shore A hardness of 90. While still restrained, each compressed stack was placed into a forced-convection oven for 16 hours at 135° C. The stacks were then cooled to room temperature and removed from the press. Test specimens were then prepared by peeling individual sheets of each stack apart and cutting 5-inch (127 mm) long dumbbell-shaped tensile specimens (2 inches wide at the ends, with a 1 inch ×1 inch test section). All specimens were cut so that the long dimension was oriented in the fabric's machine direction.

The tensile specimens were then subjected to various test solutions at both room temperature and at 82° C. for 72 hours. The test solutions are described in Table 1.

TABLE 1

| Test Solution | Composition |
|---|---|
| water (control) | tap water |
| HCl | 8% hydrochloric acid in tap water |
| $H_2SO_4$ | 8% sulfuric acid in tap water |
| NaOH | 5% sodium hydroxide in tap water |
| account | a sample of actual treating solution taken from a steel mill treating line comprising an anecdotal concentration of oil-contaminated "Formula 618-WC" (Quaker Chemical Corporation, consisting of 80–85% sodium hydroxide, 1–5% sodium hexametaphosphate, and 1–5% anhydrous sodium carbonate) in tap water |

Immediately following the 72-hour exposure to the various solutions the various specimens were blotted to remove excess solution, and tensile tests were conducted on five specimens from each example and condition. A Thwing-Albert™ tensile tester was used (Thwing-Albert Instrument Company, Philadelphia, Pa.). The gauge lenth was 1.00 inches (2.54 cm), 2-inch (5.08 cm) wide jaws were used, and the rate of test was 5.00 inches per minute (12.7 cm/min). The test machine was set to record the peak load and the percent elongation. The results are shown in table 2, wherein the values are the average of five specimens.

TABLE 2

| | | Peak Load per unit width, lbs/in (kg/cm)/percent elongation | | | | |
|---|---|---|---|---|---|---|
| Example | temp. ° C. | water (control) | HCL | $H_2SO_4$ | NaOH | Account |
| Comp. A | RT | 117(21)/111 | 72(13)/93 | 86(15)/94 | 54(10)/79 | n.d |
| | 82 | 104(19)/107 | 0.7(0.1)/50 0+ | 5(0.9)/21 | 3(0.5)/28 | n.d. |
| Comp. B | RT | 195(35)/193 | 171(31)/165 | 168(30)/176 | 162(29)/190 | n.d. |
| | 82 | 160(29)/192 | 166(30)/195 | 152(27)/188 | 149(27)/190 | n.d. |
| Example 1 | RT | 135(24)/127 | 132(24)/118 | 129(23)/116 | 132(24)/123 | n.d. |
| | 82 | 124(22)/115 | 121(22)/121 | 118(21)/122 | 113(20)/126 | 112(20)/114 |

It is known that tensile strength is the primary indicator and elongation is secondary. The possible implications are:
1. A reduction in tensile strength indicates chemical attack on the web implying the integrety of the roll might be compromised.
2. An increase in tensile strength indicates a hardening of the web which may affect wringing performance and/or healing.
3. A reduction in elongation indicates a more brittle web - again affecting wringing and healing.
4. An increase in elongation may indicate excess softening of the roll.

Deviations from the control lot (tap water) of more than 15% are considered significant. From the data of Table 2, the inventive article of Example 1 is well suited for exposure to a range of harsh chemical environments.

Example 2

Example 2 demonstrates the efficacy of the present invention when the fiber of the composition comprises a sheath and core fiber having a polypropylene sheath and a polyamide core. A 142 g/m² air-laid nonwoven web was prepared from a 10 denier ×1.5 inch (11 dtex ×38 mm) staple sheath-and-core bicomponent fiber comprising a polypropylene sheath and a nylon 6 core. A coating consisting of Hycar™ 1578X1 acrylonitrile-butadiene-styrene terpolymer was applied to the web to 100% dry add-on and dried. 6.5 inch (16.5 cm) o.d. ×4 inch (10.2 cm) i.d. annuli with 4 reverse keys were cut, saturated with water, compacted to achieve a fabric density of 732 kg/m³, and cured at 135° C. for 12 hours. Upon cooling, the compacted roll was mounted on an appropriate shaft and dressed on a lathe to produce a uniform cylindrical surface. The finished article was 6.3 inches (16 cm) o.d., was 25.1 inches (64 cm) wide, and had a hardness of between 55 and 65 on the "Shore D" durometer scale.

The finished roll was shipped to a processor of steel coil materials using highly alkaline cleaning solutions (pH >10), where it was installed and monitored for performance. The processor was seeking a roll that would last for 3 weeks in continuous use. The test roll lasted 10 weeks before its performance deteriorated sufficiently to require it to be replaced. Inspection of the roll indicated that, if re-dressed, it could be put back into service as the treatment solution had no deleterious effects on the roll composition.

Example 3

Example 3 demonstrates the incorporation of a spunbonded polypropylene web into the inventive composition. A 280 g/m² spunbonded polypropylene fabric (commercially available under the trade designation "Polyfelt TS700" from Polyfelt Geosynthetics, Ltd., Manchester, England) was coated to a 100% dry add-on with acrylonitrile-butadiene-styrene terpolymer latex (Hycar™ 1578X1) and dried at 73° C. for 6 minutes. After the terpolymer was dried, 6.5 inch (16.5 cm) o.d. ×4 inch (10.2 cm) i.d. annuli with 4 reverse keys were cut from the web, and the annuli were compacted to achieve a fabric density of 732 kg/m³. The terpolymer was heat cured by placing the compacted annuli in an oven at 135° C. for 12 hours. After cooling to room temperature, the compacted roll was mounted on an appropriate shaft and dressed on a lathe to produce a uniform cylindrical surface. The finished article was 6.3 inches (16 cm) o.d., 25.5 inches (64 cm) wide, and had a hardness of between 50 and 55 on the "Shore D" durometer scale.

The finished roll was then shipped to a processor of steel coil materials using highly alkaline(pH >10) cleaning solutions, where it was installed and monitored for performance. The processor was seeking a roll that would last for 3 weeks in continuous use. The test roll lasted 10 weeks before its performance deteriorated sufficiently to require it to be replaced. Inspection of the roll after the aforementioned 10 week period indicated that the roll could be re-dressed and put back into service as the treatment solution had not significantly contaminated (e.g., penetrated) the interior of the roll composition. No deterioration of the roll structure was observed.

Squeegeeing Efficiency Test

The test roll was evaluated for its ability to squeegee effectively by mounting it as the top roll in a two-roll set with the bottom roll being a 200 mm diameter steel roll which was power driven at a speed of 185 n/min. The test roll was forced against the smooth, polished steel roll at a loading of 13.4 kg/cm of width. The bottom steel roll was immersed in a hot water bath maintained at 82° C. After rotating the rolls for 24 hours, both rolls were hot and the test roll was thoroughly wet. A paper towel, weighing about 3.5 g was folded to yield an 8 layer structure which was 95 mm wide. After weighing the paper towel, it was folded over the edge of a 90 mm wide spatula and then the folded edge was gently but firmly held against the bottom steel roll for 5 seconds. This process was repeated five times, each time with a new towel, after which the towels were again weighed and the total weight of water pickup was recorded. Less water picked up by the towel indicated less water passed by the squeegee roll.

Fatigue Test

The performance of the test rolls was evaluated after being controllably damaged by simulating some of the severe conditions that might be encountered in steel strip processing lines. To damage the test roll, a "chopper blade" (a triangular shaped piece of steel) was secured with tape to a steel roll of a two roll set which included the test roll and the steel roll. The "chopper blade" was formed from a triangular shaped piece of cold rolled steel about 1.5 mm thick. The triangular piece of steel was approximately 75 mm by 75 mm by 100 mm and had four pointed protrusions on each 75 mm edge. The protrusions were formed from the metal triangle by bending at a right angle a cut segment of that edge. All protrusions were nearly the same shape and size and were 5 mm high. The test roll and the steel roll were then forced together under a load of 13.4 kg/cm of width and rotated for one minute to inflict severe damage to the fabric roll. The chopper blade was then removed and the test roll operated for 24 hours at a loading 13.4 kg/cm of width to allow the test roll to "heal" prior to evaluation of the squeegeeing efficiency. (Additional monitoring of performance may occur at typical intervals from removal of the chopper blade of 5 minutes, 4 hours, and 8 hours in order to discern a trend line.) The amount of water passed by the rolls was again measured (after 24 hours) using the previously described method.

Example 4

Example 4 demonstrates the ability of the inventive composition to perform as a squeegee against steel coil, even when damaged by a simulated defect in the coil being processed. A 3 mm thick, 420 g/m² nonwoven web (obtained from Crown Zellerbach Co. under the trade designation "Grade 400 Fibretex" geotextile web) of spunbonded, cross-lapped and needle punched polypropylene were coated to a 59% dry add-on with Hycar™ 1578X1 acrylonitrile-butadiene-styrene terpolymer latex and dried at 121° C. in a 15 ft (4.57 m) oven at a speed of 5 ft/min (1.52 m/min). Annuli of 6.5 inch (16.5 cm) o.d. and 2.0 inch (5.1 cm) i.d. were stacked and compressed to a roll density of about 625 kg/m³. The compacted roll was then cured at 135° C. for 16 hours. The roll was then dressed and mounted in the test machine to determine squeegee efficiency and performance after damage. Before damage, the roll generally was passing less than 0.5 gram of water/5 sec. After damage, the roll allowed water passage of only 1.77 grams/5 sec.

Various modifications and alterations of this invention will become apparent to those skilled in the art without departing from the scope and spirit of this invention, and it should be understood that this invention is not to be unduly limited to the illustrative embodiments set forth herein.

We claim:

1. An article suited for use in the surface conditioning of sheeting, the article comprising a plurality of compacted, stacked nonwoven elements, the web elements each comprising entangled fibers bonded together at points of mutual contact by an adhesive binder, the binder comprising a terpolymer of acrylonitrile butadiene styrene having a glass transition temperature between −10° C. and +40° C.

2. The nonwoven article of claim 1, wherein the terpolymer of acrylonitrile butadiene styrene has a glass transition temperature between 0° C. and 25° C.

3. The nonwoven article of claim 1, wherein the fibers comprise polyolefin fibers.

4. The nonwoven article of claim 3, wherein the polyolefin fibers are selected from the group consisting of polypropylene fibers, polyethylene fibers, and polybutylene fibers.

5. The nonwoven article of claim 4, wherein the polypropylene fibers comprise bicomponent fibers having a core component comprising a polyamide, and a sheath component covering the core component, the sheath component comprising polypropylene.

6. The nonwoven article of claim 1, wherein the web elements are spun bonded fabric.

7. The nonwoven article of claim 6, wherein the spun bonded nonwoven fabric comprises polypropylene fibers.

8. The nonwoven article of claim 1, wherein the web elements have been needle tacked.

9. The nonwoven article of claim 1, wherein the plurality of compacted, stacked nonwoven web elements have a compacted density of at least about 244 kg/m³.

10. The nonwoven article of claim 1, wherein the fibers have a linear density within the range from about 1 to 50 denier.

11. The nonwoven article of claim 1, wherein the terpolymer comprises from about 15 to about 35 weight percent acrylonitrile, from about 20 to about 40 weight percent styrene, and from about 20 to about 65 weight percent butadiene.

12. The nonwoven article of claim 1, wherein the nonwoven web elements are disk-shaped and the plurality of compacted, stacked nonwoven web elements are cylindrically shaped.

13. The nonwoven article of claim 1, wherein the nonwoven web elements are rectangularly shaped and the plurality of compacted, stacked nonwoven web elements form a slab.

14. The nonwoven article of claim 1, wherein the terpolymer of acrylonitrile butadiene styrene is carboxylated.

15. The nonwoven article of claim 14, wherein the terpolymer of acrylonitrile butadiene styrene has a degree of carboxylation between about 0.5 to about 5.0 percent.

16. The nonwoven article of claim 1, wherein the binder is a cured, aqueous latex terpolymer of acrylonitrile butadiene styrene.

17. A roll suited for surface conditioning of sheeting, the roll comprising a cylindrical body supported on its cylindrical axis for rotation, the cylindrical body comprising a plurality of compacted, stacked, disc shaped nonwoven web elements, the web elements each comprising entangled fibers, wherein adjacent fibers in each web element are bonded together at points of mutual contact by an adhesive binder, the binder comprising a terpolymer of acrylonitrile butadiene styrene having a glass transition temperature between −10° C. and +40° C.

18. The roll of claim 17, wherein the nonwoven web elements each have a central opening and the cylindrical body is supported on a shaft which passes through the opening of each of the nonwoven web elements.

19. The roll of claim 18, further comprising flanges on either end of the cylindrical body, the flanges being mechanically fastened to the shaft to maintain the compacted pile at a density of at least about 244 kg/m$^3$.

20. The roll of claim 19, wherein the shaft is keyed to prevent rotation of the nonwoven web elements on the shaft.

21. The roll of claim 17, wherein the terpolymer of acrylonitrile butadiene styrene has a glass transition temperature between 0° C. and +25° C.

22. The roll of claim 17, wherein the fibers comprise polyolefin fibers.

23. The roll of claim 22, wherein the polyolefin fibers are selected from the group consisting of polypropylene fibers, polyethylene fibers, and polybutylene fibers.

24. The roll of claim 23, wherein the polypropylene fibers comprise bicomponent fibers having a core component comprising a polyamide, and a sheath component covering the core component, the sheath component comprising polypropylene.

25. The roll of claim 17, wherein the nonwoven web elements are spunbonded.

26. The roll of claim 25, wherein the nonwoven web elements comprise polypropylene fibers.

27. The roll of claim 17, wherein the fibers of the nonwoven web elements have been needle tacked.

28. The roll of claim 17, wherein the compacted pile has a density of at least about 244 kg/$^3$m.

29. The roll of claim 17, wherein the fibers have linear densities within the range from about 1 to 50 denier.

30. The roll of claim 17, wherein the terpolymer comprises from about 15 to about 35 weight percent acrylonitrile, from about 20 to about 40 weight percent styrene, and from about 20 to about 65 weight percent butadiene.

31. The roll of claim 17, wherein the terpolymer of acrylonitrile butadiene styrene is carboxylated.

32. The roll of claim 31, wherein the terpolymer of acrylonitrile butadiene styrene has a degree of carboxylation between about 0.5 to about 5.0 percent.

33. The roll of claim 17, wherein the binder is a cured, aqueous latex terpolymer of acrylonitrile butadiene styrene.

* * * * *